United States Patent [19]

Appert

[11] 4,097,155
[45] Jun. 27, 1978

[54] TARGET LOCATING SYSTEM

[75] Inventor: Quentin D. Appert, Tustin, Calif.

[73] Assignee: Rockwell International Corporation, Anaheim, Calif.

[21] Appl. No.: 656,987

[22] Filed: Jul. 24, 1967

[51] Int. Cl.² .................. G01B 11/26; G02B 23/10
[52] U.S. Cl. .................... 356/152; 89/41 L; 350/174; 356/29; 356/251; 356/252
[58] Field of Search ............... 88/1 M, 1 Z; 250/203; 343/6 IR; 89/41 L; 356/152, 29, 251, 252; 244/3.16; 350/174

[56] References Cited
U.S. PATENT DOCUMENTS

| | | | |
|---|---|---|---|
| 2,422,122 | 6/1947 | Norton | 343/114.5 |
| 2,950,340 | 8/1960 | Compton et al. | 88/1 Z |
| 3,143,650 | 8/1964 | Mizen | 250/203 X |
| 3,262,210 | 7/1966 | Shapiro et al. | 88/1 Z |
| 3,300,777 | 1/1967 | Tarr | 343/6 IR |
| 3,305,633 | 2/1967 | Chernoch | 250/199 |
| 3,320,420 | 5/1967 | Paglee et al. | 343/6 IR |

Primary Examiner—S. C. Buczinski
Attorney, Agent, or Firm—Rolf M. Pitts; H. Fredrick Hamann; L. Lee Humphries

[57] ABSTRACT

A forward observer directs a pulsed neodymium laser illuminator in the direction of a target to be marked. A detector-receiver which is fixedly mounted to an attacking aircraft detects the reflected laser energy and determines its direction of incidence. Four indicator lights are projected onto a conventional gunsight combining plate together with a crosshair reticle. The lights provide the pilot with steering signals which will permit him to aline the crosshairs and the target.

9 Claims, 4 Drawing Figures

TARGET LOCATING SYSTEM

BACKGROUND OF THE INVENTION

1. Field of the Invention

The present invention relates to a target locating system and, more particularly, to a system for providing a remote observer with an indication of the direction to a target which is designated by a forward observer.

2. Description of the Prior Art

The type of target locating system embraced within the scope of the present invention contemplates the use of a forward observer who is operative to identify and mark a target for a remote observer. Such a system has obvious utility in a hostile environment wherein the target is an enemy and the remote observer is the pilot of an attacking aircraft whose function is to destroy the target.

Many prior art systems have been devised for performing the function of identifying and marking a target for an attacking aircraft. One such system employs smoke bombs which are released in the vicinity of the target by the forward observer. The attacking aircraft may then locate the target by noting the origin of the smoke. Another approach has been to use a radio link between the forward observer and the attacking craft whereby the forward observer verbally directs the craft to the location of the target. Still other prior art systems utilize radio transmitting devices which are placed in the vicinity of a target and which can be tracked by the attacking craft.

When used in a hostile environment, it is obvious that the effectiveness of a target locating system depends largely upon its ability to identify and mark the target without disclosing to the enemy the position of the forward observer and without indicating to the target that it is being identified. If the enemy is aware of the position of the forward observer, he can obviously take steps to eliminate him. Furthermore, if the enemy is aware of the fact that he is being identified, he can take steps to avoid the attacking aircraft. Because of these requirements, smoke bombs have fallen into general disuse as target locaters, since they not only disclose the position of the forward observer, but clearly indicate to the target that it is being marked. Similarly, all target locating systems which rely on radio links between the forward observer and the attacking aircraft are undesirable because of the relative ease for the enemy to monitor the radio transmissions.

In order to overcome these disadvantages of prior art target locating systems, it has been proposed to use a laser illuminator for target marking. Such a system is composed of two major subsystems, a laser illuminator for the forward observer on the ground or airborne, and a detector-receiver for the remote observer. The laser is used to illuminate the target by the forward observer who has visual contact with it. The detector-receiver device, which may be mounted in an aircraft, then detects the reflected laser energy so that the pilot may steer the craft in the direction of the illuminated target. If invisible radiation is used, such an approach has the obvious advantage of providing target identification and marking without disclosing the position of the forward observer and without indicating to the target that it is being identified. However, even though such a system appears to solve the problems of the prior art, no successful system for target marking with a laser illuminator and airborne detector-receiver has yet been operated.

One approach to the problem utilizes a gimbaled detector-receiver which is operative to track the target. The gimbals permit the receiver to move relative to the craft so that it can lock onto and track the target. A reticle sight installed in the aircraft is slaved to the detector-receiver so that when the receiver has located the target, the pilot can, by looking through the sight, determine the direction of the target for pointing his weapons accordingly. Although such a system is possible, its practical utility is questionable because of its complexity and low reliability. The complexity of the system results from the gimbals which are required for the detector-receiver unit so that it can move relative to the aircraft and from the servo apparatus which is required for driving the detector-receiver as a function of the received illumination. Because of this complexity, the accuracy and reliability of the system is very poor. The accuracy and reliability is diminished even further because of the complexity of the apparatus for slaving the reticle sight to the detector-receiver unit, this apparatus requiring the reticle to be gimbaled and driven by an associated servo system.

Another prior art system implements the concept of target marking with a laser illuminator and airborne detector-receiver by using a gated image orthicon television receiver as the detector-receiver. The television receiver is pointed in the direction of the target and provides the pilot of the aircraft with a television display of the target area which has superimposed thereon a spot of light indicating the direction from which the reflected laser illumination is received. Such a system has several obvious disadvantages, a first of which is that the pilot must correlate that which he sees on his television monitor with that which he observes by looking at the scene in front of the aircraft. This is often a difficult and time consuming task. Secondly, a compromise must be made between sensitivity and secrecy. Television receivers with surfaces which are responsive to the light from a ruby laser have high sensitivity but the ruby light is visible to the eye. Therefore, high sensitivity can be achieved only by permitting the enemy to know he is being marked. On the other hand, if invisible radiation is used, a television receiver surface which is far less sensitive must be used thereby severely decreasing the range and practical utility of the system. Finally, since a television receiver is operative to integrate received light, and the normal integration time is much greater than the pulse width of the laser illuminator, the receiver has the effect of masking the received pulse with noise. As a result, in order for the system to operate effectively, the receiver must be gated on for a short period of time when the pulse is received. This requires a radio link between the forward observer and the television receiver for synchronization thereby increasing the complexity of the system and the possibility of detection by the enemy.

SUMMARY OF THE INVENTION

According to the present invention, these and other prior art problems are solved by providing a novel system for target marking using a laser illuminator and detector-receiver. The illuminator for the forward observer may preferably be a neodymium laser which transmits invisible radiation at a fixed pulse rate. The laser is used to illuminate the target by the forward observer who has visual contact with it. The forward observer then calls for an attack. The detector-receiver is operative to detect the reflected laser energy and provide an indication of the direction to the illuminated target. In the preferred embodiment, the detector-receiver is mounted in an aircraft and is operative to provide the pilot thereof with steering signals which will permit him to direct his weapons at the target. In other embodiments, the detector-receiver may be mounted for use by land or sea forces for locating a target. In any event, the detector-receiver unit includes a detector element which is divided into a plurality of quadrant sections thereby making separate detector elements. Signal processing electronics coupled to the separate detector elements determines the quadrant receiving the greatest signal and activates a corresponding target indicator. Four target indicators are preferred and they may be used in conjunction with a conventional gunsight combining plate and a projected crosshair reticle sight. One target indicator light is located in each quadrant of the reticle cross. The detector-receiver unit and reticle are boresighted so that the flashing light indicates the visual quadrant area containing the illuminated target. The pilot may then maneuver the aircraft or the detector-receiver and display units to bring the crosshair center into this quadrant area. When the flashing light changes quadrants, it indicates that the target has traversed a crosshair line. Thus, by maneuvering the aircraft, the crosshair can be driven to visual correlation with the target.

The advantages of such a system are obvious. The detector-receiver unit may be non-gimbaled and fixedly mounted to the aircraft, thereby eliminating the complex and costly gimbaling apparatus in the aircraft. Or, the entire system may be mounted on a moveable support so that the direction of the target may be located independently of the direction of flight of the aircraft. The system complexity is reduced even further by the fact that the pilot operates as the servoing element thereby permitting the equipment to be made small in size and lightweight, highly desirable characteristics in modern aircraft. The pilot display need only indicate the direction in which to manipulate the detector-receiver unit to aline its boresight axis with the line of sight to the target. In the preferred embodiment, the target indicator lights are superimposed on an existing gunsight combining plate to tell the pilot the direction in which to steer the craft. This has the further advantage of providing a heads-up display. The pilot can look through the sight in the actual direction of the target and maneuver the craft in the direction indicated by the flashing lights. This eliminates system complexity with a corresponding increase in reliability. Finally, although the system supplies quadrant information, the pilot's use of the background scene to obtain rate information results in rapid and accurate target identification.

OBJECTS

It is, therefore, an object of the present invention to provide a novel target locating system.

It is a further object of the present invention to provide a system for target marking using a laser illuminator and a remote detector-receiver.

It is a still further object of the present invention to provide a system for target marking with a laser illuminator in which the detector-receiver and display units are non-gimbaled and fixedly mounted to a support means.

It is another object of the present invention to provide a novel display system for a target locating system.

It is still another object of the present invention to provide a novel target tracking system in which a human being operates as an element in the servo loop.

Still other objects, features and attendant advantages of the present invention will become apparent to those skilled in the art from a reading of the following detailed description of a preferred embodiment constructed in accordance therewith, taken in conjunction with the accompanying drawings wherein:

DESCRIPTION OF THE PREFERRED EMBODIMENTS

Figure 1:
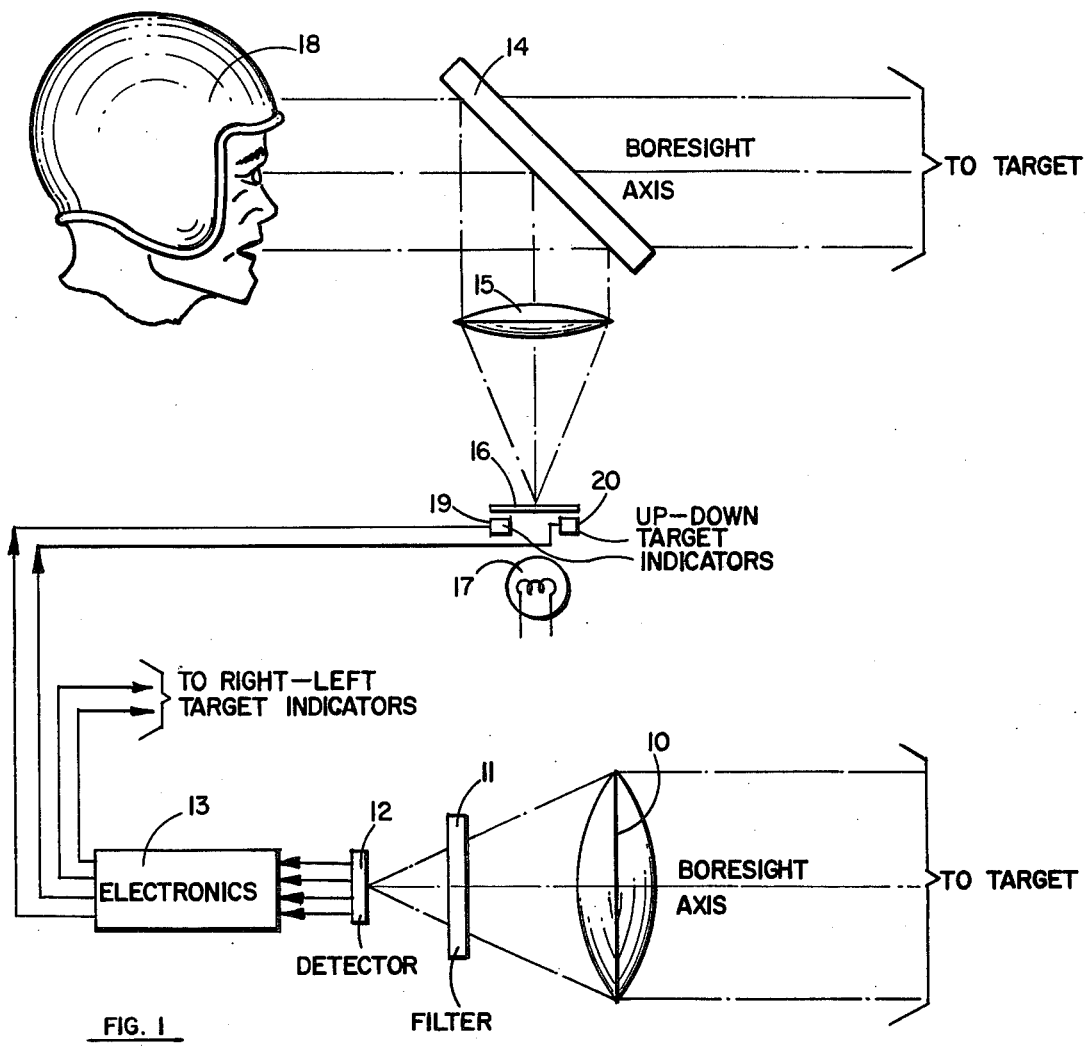
FIG. 1 is a schematic representation of the present target locating system showing the detector-receiver and the display.

Referring now to the drawings, and, more particularly, to FIG. 1 thereof, there is shown a schematic representation of the present invention. The present target locating system is composed of two major subsystems, the laser illuminator for the forward observer who is on the ground or airborne, and the detector-receiver and display for the remote observer who is on the ground or airborne. According to the preferred embodiment, the illuminator for the forward observer is a neodymium laser which transmits invisible radiation at a fixed pulse rate which may be four pulses per second and at 1.06 microns wavelength. The laser is used to illuminate the target by the forward observer who has visual contact with it. After the forward observer has made visual contact with the target and has illuminated it, he may call for an attack which, in the preferred embodiment, would be carried out by an airborne vehicle. To maximize the range of the system, when the forward observer calls the attacking aircraft he may position the attacking aircraft in a sector of approximately 60° to either side of the approximate bearing from his position to the target and to the rear of his position with the aircraft heading on the approximate bearing to the target from the observer. In this manner, the detector-receiver unit mounted in the aircraft is operative to detect the reflected laser energy.

According to the preferred embodiment, the detector-receiver unit is non-gimbaled and fixedly mounted internally or externally to the attacking aircraft, although it is possible to mount the unit for relative movement with respect to the craft. The detector-receiver unit consists of a collecting lens 10, an optical interference filter 11, a detector 12, and signal processing electronics 13. Collecting lens 10 is operative to receive the reflected laser energy and focus it on detector 12. Interference filter 11 may be a 200 angstrom narrow band filter peaked at 1.06 microns which is included to prevent detector 12 from becoming background noise limited in bright sunlight. Detector 12 may be a silicon junction device divided into a plurality of quadrant sections thereby making separate detector elements as shown more clearly in FIG. 3. In the preferred embodiment, detector 12 is divided into four quadrants although it would be possible to use as few as three quadrants or more than four. Electronics 13 amplifies the detected signal and, by way of logic circuitry to be described more fully hereinafter, determines which detector quadrant contains the centroid of signal energy. Electronics 13 is then operative to control the target indicators to indicate to the pilot the direction in which to steer the aircraft in order to aline the boresight axis of the detector-receiver with the line of sight to the target.

The preferred display technique utilizes gunsights already installed in an aircraft for the purpose of providing a heads-up display. Still referring to FIG. 1, the existing gunsight consists of a combining plate 14, a focusing lens 15, a crosshair reticle 16, and a source of light 17. Source 17 illuminates crosshair reticle 16, an image of which is focused by lens 15 onto combining plate 14. The pilot 18 may then look through combining plate 14 in the direction of the target and see the actual scene in front of the aircraft with the crosshair reticle superimposed thereon.

Figure 2:
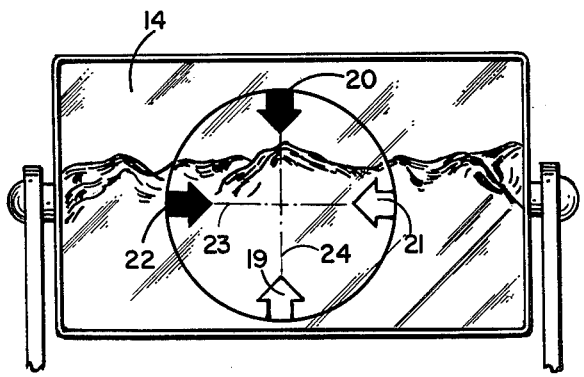
FIG. 2 is a view of the pilot display.

According to the present invention, the existing gunsight display is modified by adding a plurality of target indicators. Since detector 12 is divided into four quadrant sections and signal processing electronics 13 is operative to determine which detector quadrant contains the centroid of signal energy, four target indicators are required. More specifically, and as shown most clearly in FIG. 3, the display includes a first target indicator 19 for commanding upward movement of the craft in order to aline the boresight axis and the line of sight to the target, a second target indicator 20 for commanding downward motion of the craft, a third target indicator 21 for commanding motion of the craft to the left and a fourth target indicator 22 for commanding motion of the craft to the right. For the purpose of providing the most effective type of display, the target indicators may be projected with crosshair reticle 16 onto combining plate 14 to provide a display as shown in FIG. 2. FIG. 2 shows what would be seen by pilot 18 by looking through combining plate 14. Since pilot 18 is looking through combining plate 14 at the background scene, he will see this on combining plate 14. Superimposed on the background scene will be an image of reticle 16 which includes crosshairs 23 and 24. As shown in FIG. 1, target indicators 19-22 may be superimposed on the display by locating the target indicators immediately behind reticle 16, only up-down target indicators 19 and 20 being shown in FIG. 1. Target indicators 19-22 may contain separate light sources which are activated by electronics 13 or target indicators 19-22 may be illuminated by light source 17 by providing a shutter between light source 17 and each of target indicators 19-22 so that electronics 13 would be operative to selectively remove the appropriate shutters. As shown in FIG. 2, such a system is operative to flash a display light in the pilot's field of view indicating the direction in which to maneuver the aircraft. In FIG. 2, display lights 20 and 22 are shown illuminated so as to command motion of the craft to the right and down. As shown in FIG. 2, there is one target indicator located in each quadrant of the reticle cross. The detector-receiver and reticle are boresighted so that a flashing light indicates the visual quadrant area containing the illuminated target. The pilot may then maneuver the aircraft to bring the crosshair center into this quadrant area. When the flashing light changes quadrants, it indicates that the target has traversed a crosshair line. Thus, by maneuvering the aircraft, the crosshairs can be driven to visual correlation with the target.

The search for the target may be accomplished by maneuvering the aircraft so as to sweep the receiver's acquisition field of view over the suspected target area. Detection is indicated by one of the target indicators flashing at the laser illuminator pulse rate. In a preferred embodiment, this rate is 4 pulses per second, since a pilot could not utilize a higher repetition rate because of his limited response time.

For the detector-receiver unit to acquire the illuminated target, a certain minimum energy must be present at the receiver. The distance from the target at which the initial acquisition occurs is a function of range, atmospheric conditions, target reflectivity and angle between the receiver boresight axis and the line of sight to the target. It has been found that using a neodymium laser illuminator transmitting 1 megawatt of power per pulse, that the acquisition range is approximately 6 nautical miles for green foilage targets in clear 10 mile visibility weather with the illuminator and receiver approximately normal to the target.

Detector 12 may be a four element silicon P-I-N photodiode array with a circular field of view. Detector 12 may be made from a single silicon chip so as to provide uniform characteristics among the four quadrants. Detector 12 is divided into quadrants by cutting grooves into the depletion layer of the device which results in minimum loss of signal when the collected signal radiation falls on the quadrant axis.

Figure 3:
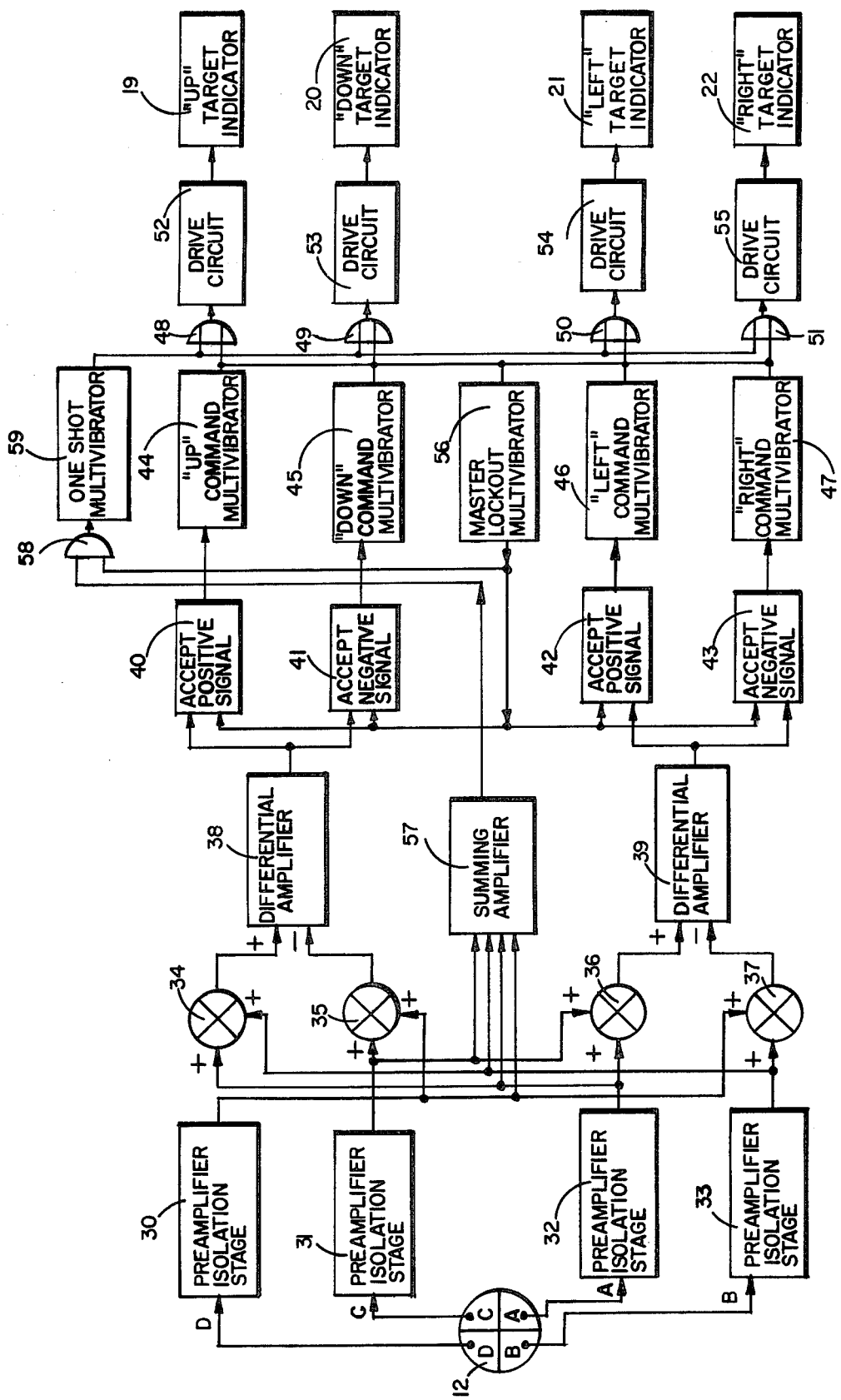
FIG. 3 is a block diagram of a preferred embodiment of the detector-receiver electronics.

Referring now to FIG. 3 there is shown a block diagram of a preferred embodiment of electronics 13. Electronics 13 is operative to amplify the detected signals and apply logic to determine which detector quadrant contains the centroid of signal energy, thereby flashing the corresponding target indicator. Thus, when the signal is spread over more than one quadrant, the target quadrant is determined by the signal centroid. In FIG. 3, detector 12 is shown as being divided into four quadrants which are marked A, B, C, and D. The outputs of the detector quadrants are applied to a plurality of pre-amplifier isolation stages 30-33 for the purpose of matching the output impedance of detector 12 to the input impedance of the remainder of the circuitry. The decision as to which quadrant receives the most signal is determined by adding the upper detector outputs (C+D) and the lower detector outputs (A+B) and then subtracting the two sums to obtain (C+D) − (A+B). In order to perform this function, the outputs of stages 30 and 31 are applied to a summing circuit 35, the output from which is applied to a first input of a differential amplifier 38. Similarly, the outputs of isolation stages 32 and 33 are applied to a summing circuit 34, the output from which is applied to a second input of differential amplifier 38. The inputs to differential amplifier 38 are such that the difference output therefrom is positive if the signal from summing circuit 34 is greater than the signal from summing circuit 35 and is negative if the signal from summing circuit 35 is greater than the signal from summing circuit 34. In this manner, differential amplifier 38 determines whether the upper or lower half of detector 12 has more signal. If the two detector outputs were not added, the maximum acquisition range would be reduced by a factor of $\sqrt{2}$. This logic scheme has the advantage of giving an up or down signal when the radiation is divided between the right and left half and the signal from a single quadrant would not be sufficient for detection at the maximum acquisition range. Similar logic consisting of a pair of summing elements 36 and 37 and a differential amplifier 39 responsive to the outputs therefrom is employed to obtain a right or left output signal.

The output of differential amplifier 38 is applied to circuits 40 and 41. Circuit 40 is operative to accept only positive signals whereas circuit 41 is operative to accept only negative signals. Similarly, the output of differential amplifier 39 is applied to circuits 42 and 43, the former being operative to accept only positive signals and the latter being operative to accept only negative signals. The outputs of circuits 40-43 are applied to a plurality of one-shot command multivibrators 44-47, respectively. In this manner, either "up" multivibrator 44 or "down" multivibrator 45 will be triggered, depending upon whether the upper or lower half of detector 12 has more signal, and either "left" multivibrator 46 or "right" multivibrator 47 will be triggered, depending upon whether the left or right half of detector 12 has more signal. The outputs of command multivibrators 44-47 are coupled via OR gates 48-51, respectively, to driver circuits 52-55, respectively, which supply current to trigger target indicators 19-22, respectively. Thus, an up or down and a right or left target indicator will be triggered for each received signal.

In order to insure that multivibrators 44-47 are triggered only once for each pulse from the laser illuminator, a one-shot master lockout multivibrator 56 which is triggered by the outputs from multivibrators 44-47 is provided. The output of multivibrator 56 is applied to circuits 40-43 which may contain AND gates so as to prevent the circuits from triggering multivibrators 44-47 for a period of 250 milliseconds after the receipt of a signal. In this manner, the system rejects pulses whose repetition rate is greater than 4 c.p.s, thereby synchronizing on the 4 c.p.s. signal rate. This feature makes the system less susceptible to jamming by conventional pulsed light sources.

FIG. 3 also includes circuitry for lighting all four target indicators 19-22 when the detector-receiver is pointed directly at the target and the signal is divided over four quadrants so that the signal amplitude in each quadrant is insufficient to fire multivibrators 44-47. This is accomplished by summing the outputs of stages 30-33 in a summing amplifier 57, the output from which is applied as a first input to an AND gate 58. Since summing amplifier 57 will always provide an output when a signal is received by any of the stages 30-33, it is necessary to provide to the other input of AND gate 58 a signal which indicates that there is no up-down or right-left indication. Such a signal exists at the output of multivibrator 56, since multivibrator 56 will not be triggered if none of multivibrators 44-47 have been triggered. Therefore, the output of multivibrator 56 is applied as the second input to AND gate 58, the output from which is applied to a one-shot multivibrator 59, which is operative to apply a signal to each of OR gates 48-51, so as to trigger each of driver's 52-55 and to activate all of target indicators 19-22.

Figure 4:
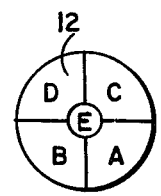
FIG. 4 is a schematic representation of an alternative detector for use in the present invention.

Another technique for triggering all four target indicators when the receiver is pointed directly at the target may be seen by reference to FIG. 4 which shows an alternative design for detector 12. In FIG. 4, detector 12 has four quadrants, A, B, C and D, as in FIG. 3, together with a fifth circular portion E at the center thereof. The output of circular portion E would also be applied to a suitable preamplifier isolation stage. With such a detector, each of quadrants A, B, C and D would be connected as shown in FIG. 3. However, instead of summing the outputs of quadrants A, B, C and D in summing amplifier 57, the output of the preamplifier isolation stage association with center section E may be applied directly as a first input to AND gate 58. Therefore, if the return signal lies totally within section E, AND gate 58 will be triggered. However, if the signal also lies in any of quadrants A, B, C or D, AND gate 58 will not be triggered. The configuration shown in FIG. 4 has the advantage of permitting an on target indication to be made with a tolerance determined by the diameter of sector E.

Although falling outside the scope of the present invention, special logic circuitry should also be provided to insure that the detector-receiver unit will ignore erroneous signals such as atmospheric back-scatter returns and returns from small objects such as wires which the illuminator operator may not see and may unintentionally illuminate. The special logic circuitry would be operative to trigger the target indicator according to the last signal pulse received in a given period of time. This period of time would be determined by the time it takes for the laser pulse to reach and return from the target after the laser is fired, and thus, by the distance between the illuminator and target. This last pulse selection may be accomplished in any convenient manner. For example, if the electronics shown in FIG. 3 is used, the total signal output from summing amplifier 57 may be used to continually re-set command multivibrators 44-47 on the leading edge of each signal pulse. The trailing edge of each pulse from differential amplifiers 38 and 39 may then be used to trigger command multivibrators 44-47. In this manner, if one of multivibrators 44-47 is triggered and another pulse immediately follows the actuating pulse, the command multivibrator will be immediately re-set by the leading edge of the second pulse and triggered by the trailing edge thereof. This re-setting may occur for a period of time determined by the master lockout multivibrator 56 by applying a signal from multivibrator 56 to multivibrators 44-47 and to summing amplifier 57. At the end of this period of time, a signal from master lockout multivibrator 56 switches summing amplifier 57 off. In this manner, the last pulse in the reset time period determines which command multivibrator is triggered. Since the illuminator can be as far as five nautical miles from the target, the reset time period may be set at approximately 65 microseconds.

While the invention has been described with respect to a preferred physical embodiment constructed in accordance therewith, it will be apparent to those skilled in the art that various modifications and improvements may be made without departing from the scope and spirit of the invention. For example, whereas the invention has been discussed with respect to a hostile environment, it will be obvious that it need not be so used. Other applications include the designation of runways, instrument landing systems, etc. In addition, the pilot display may be other than as shown and, under some circumstances, need not include a view of the scene in front of the aircraft. Accordingly, it is to be understood that the invention is not to be limited by the specific illustrative embodiments but only by the scope of the appended claims.

I claim:

1. In a target locating system wherein a target is illuminated by a pulsed laser illuminator, operating at a preselected fixed pulse rate, by a forward observer, means for use by a remote observer for determining the direction of said target comprising, in combination:

means for receiving and detecting the pulsed laser illumination reflected from that target, said means being sensitive to the direction of incidence of said reflection illumination with respect to a reference axis; and means responsive to said direction sensitive means for generating a visual indication of the direction of said target with respect to said reference axis, said visual indication generating means comprising means for preventing said visual indication from responding to light pulses whose repetition rate is different from said fixed pulse rate, whereby said remote observer may position said direction sensitive means to align said reference axis with the line of sight to said target.

2. The target locating system of claim 1 wherein said means for receiving and detecting comprises:

a detector element which is divided into a plurality of quadrant sections; and wherein said means for generating comprises:

means operatively coupled to said quadrant sections for determining which of said quadrant sections receives the greatest amount of reflected illumination from said target.

3. The target locating system of claim 2 wherein said detector element is divided into four quadrant sections; and wherein said means for generating further comprises:

four indicator lights operatively coupled to said determining means for selectively commanding up, down, right and left motion of said direction sensitive means.

4. The target locating system of claim 3 wherein said means for generating is adapted for use with a gunsight which includes a combining plate, a crosshair reticle and means for projecting an image of said reticle onto said combining plate, said means for generating further comprising:

means for projecting said indicator lights onto said combining plate whereby said remote observer is provided with a heads-up display of the scene in the vicinity of said target with the crosshair reticle and indicator lights superimposed thereon.

5. The target locating system of claim 4 wherein the reference axis of said direction sensitive means is slaved to said reticle whereby motion of said reticle in the direction indicated by said lights moves said reference axis into alinement with the line of sight to said target.

6. The target locating system of claim 5 wherein said means for generating further comprises:

means for activating all of said indicator lights when said reference axis is alined with said line of sight to said target.

7. The target locating system of claim 4 wherein said means for receiving and detecting, said means for generating a visual indication and said gunsight are all fixedly mounted with respect to each other.

8. The target locating system of claim 1 wherein said means for receiving and detecting comprises:

a detector element divided into four quadrant sections and a circular section located at the center of said detector; and wherein said means for generating comprises:

four target indicators for providing up, down, right or left commands;

means operatively coupled to said four quadrant sections and said target indicators for determining which of said quadrant sections receives the greatest amount of illumination from said target and for selectively activating said target indicators as a function thereof to command up, down, right or left motion of said direction sensitive means; and means operatively coupled to said four quadrant sections, said circular section and said target indicators for triggering all of said indicators when said reference axis is aligned with the line of sight to said target.

9. The target locating system of claim 8 wherein said means for generating a visual indication is adapted for use with a gunsight which includes a combining plate, a crosshair reticle and means for projecting an image of said reticle onto said combining plate, said means for generating comprising:

means for projecting said target indicators onto said combining plate whereby said remote observer is provided with a heads-up display of the scene in the vicinity of said target with the crosshair reticle and target indicators superimposed thereon.

* * * * *